United States Patent [19]
Bjorkman

[11] 3,775,187
[45] Nov. 27, 1973

[54] PRODUCTION OF AQUEOUS ZINC CHLORIDE ELECTROLYTE SATURATED WITH CHLORINE

[75] Inventor: Harry K. Bjorkman, Birmingham, Mich.

[73] Assignee: Occidental Energy Development Company, Madison Heights, Mich.

[22] Filed: Nov. 18, 1971

[21] Appl. No.: 200,067

[52] U.S. Cl. ............................. 136/86 A, 136/156
[51] Int. Cl. H01m 31/00, H01m 29/02, H01m 11/00
[58] Field of Search .................. 136/86 A, 86 E; 423/219, 97; 261/40

[56] References Cited
UNITED STATES PATENTS
963,852  7/1910  Benko ........................... 136/86 A
2,921,110  1/1960  Crowley et al. ................ 136/86 A
3,635,764  1/1972  Setser et al. .................. 136/86 A
3,227,585  1/1966  Langford et al. .............. 136/86 E Primary Examiner—A. B. Curtis
Assistant Examiner—H. A. Feeley
Attorney—William J. Schramm

[57] ABSTRACT

An aqueous solution of zinc chloride is saturated with chlorine gas by flowing a zinc chloride solution through a saturator vessel in continuous flow from top to bottom thereof, passing chlorine gas in very finely divided form into the bottom of the vessel into contact with the moving zinc chloride solution so that chlorine not dissolving in the zinc chloride solution rises to the top of the vessel, and recirculating chlorine gas from the top of the vessel, mixing it with additional chlorine gas to be fed to the bottom of the vessel and passing recycle and feed chlorine gases into the zinc chloride solution in finely divided form at the bottom of the vessel.

3 Claims, 3 Drawing Figures

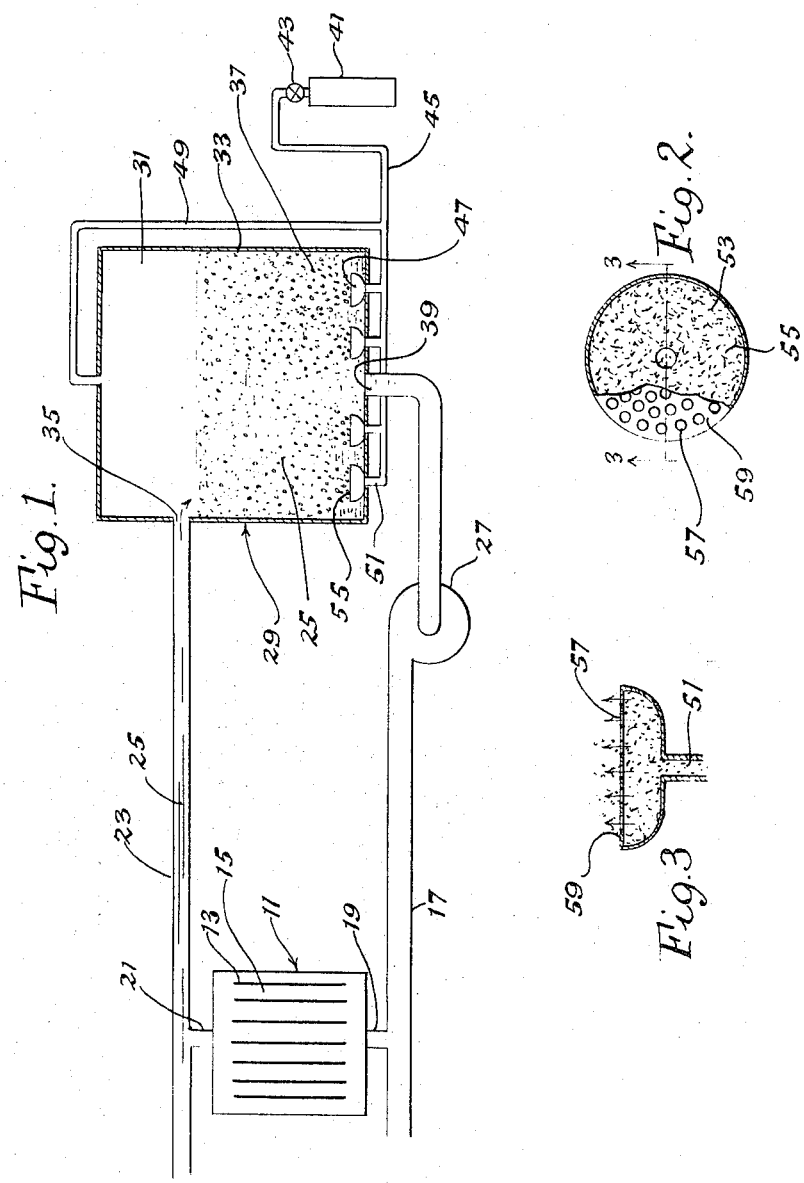

PRODUCTION OF AQUEOUS ZINC CHLORIDE ELECTROLYTE SATURATED WITH CHLORINE

BACKGROUND OF THE INVENTION

In the operation of high energy density secondary batteries based on zinc and chlorine-on-carbon electrodes, an aqueous zinc chloride solution saturated with chlorine is used as a feed to the anodes during the discharging of the battery. Chlorine is converted to chloride ion at the anode and metallic zinc or other suitable metal on the surface of the other cathode is converted to the corresponding metal ion. The effluent from the battery is unsaturated with respect to chlorine and has to be resaturated before being recirculated to the same or similar battery during a continuing discharging operation. Thus, to keep such batteries in operation, it is necessary to continuously resaturate an aqueous zinc chloride solution with chlorine.

Difficulty has been noted in attempting to saturate zinc chloride solutions, especially those of the more concentrated types generally employed in high energy density batteries. Often, using conventional bubbling and mixing techniques, the solution rate is slow and only partially resaturated zinc chloride solution is returned to the batteries, leading to lower efficiencies of power discharge. To overcome such difficulties larger volumes of saturator vessels have been used so that the holdup time in the vessel may be lengthened. Now, however, it has been discovered that such saturating operation, difficult as it often is, can be speeded significantly by following the process of this invention.

SUMMARY OF THE INVENTION

In accordance with the present invention, an apparatus for dissolving chlorine in an aqueous solution of zinc chloride and saturating the solution with chlorine comprises a vessel or passage through which the zinc chloride solution flows, a duct for communication of a source of chlorine with the flowing electrolyte and, between the duct and the vessel or passage, a means for breaking down a stream of chlorine gas from the source of chlorine into a plurality of very thin streams of chlorine gas and chlorine gas bubbles, which break off therefrom as they enter the volume of the zinc chloride solution. With respect to the method aspect of the invention, it comprises a method for dissolving chlorine in an aqueous solution of zinc chloride and saturating the solution with chlorine by passing into a volume of moving zinc chloride solution very thin streams of chlorine gas and chlorine gas bubbles from bottom to top of such solution and into a zone above such solution, withdrawing undissolved chlorine gas from the zone, mixing it with other chlorine gas and admitting it to the bottom of the solution in a plurality of very thin streams and bubbles, adding unsaturated zinc chloride solution to the top of the volume and withdrawing saturated zinc chloride solution from the bottom thereof at substantially the same rate as solution is added to the volume.

DESCRIPTION OF THE PREFERRED EMBODIMENTS

The present invention and its mode of operation will be apparent from the following description, taken in conjunction with the accompanying drawing, in which:

FIG. 1 is a substantially schematic, partly sectional elevational view of the apparatus of this invention, showing flow of electrolyte through a saturator and its return to a high energy density battery being discharged;

FIG. 2 is a cutaway plan of a glass frit sparger utilized to produce chlorine bubbles passed through an electrolyate to be saturated with chlorine; and FIG. 3 is a central vertical sectional view of such sparger along plane 3—3 of FIG. 2.

A high energy density secondary battery or cell bank 11 includes a plurality of bipolar (or monopolar) electrodes 13 and electrolyte zones 15 between the electrodes. In discharging electricity from the battery, electrolyte containing elemental halogen is passed into the battery through line 17 and inlet 19 and exits from the battery through outlet 21 and line 23. In a battery having bipolar cells in which the electrodes are of a highly electropositive metal, such as Group IIB, VIII, especially zinc, and chlorine-on-carbon, the electrolyte is aqueous metal halide solution such as zinc chloride, usually at a concentration of 0.1 to saturation, preferably 5 to 50 percent and even more preferably 10 to 50 percent zinc chloride, and contains chlorine dissolved therein, usually from 0.5 to 3 volumes of chlorine per volume of electrolyte. As the electrolyte passes through the battery the chlorine is converted to chloride ion and zinc from the zinc electrode dissolves in the electrolyte, forming zinc ion. Thus, when the electrolyte enters the cell through inlet 19 it contains dissolved elemental chlorine (chlorine gas) and when it leaves through exit 21 it is depleted in chlorine content. Therefore, it must be resaturated with chlorine before being recirculated through the battery during the discharge mode.

It will be noted that in FIG. 1 the representation of the battery is schematic and specific paths for electrolyte flow, other than a generally vertical flow, are not shown. The electrolyte may pass through a porous carbon anode, as is described in an application identified as Case U–10–033 Ser. No. 200,041, filed the same day as the present application, entitled BIPOLAR ELECTRODE FOR CELL OF HIGH ENERGY DENSITY SECONDARY BATTERY, in which the present inventor is a co-inventor. Alternatively, flow may be in a cell containing a separator or membrane between the electrodes and plural flows of electrolyte may be utilized. Other cell types and various materials of construction are disclosed in U.S. Pat. application Ser. No. 50,054 for HALOGEN HYDRATES, now U.S. Pat. No. 3,713,888, in which the present inventor is also a co-inventor. In all such cases, it will still be necessary to resaturate effluent from the cell or another source with chlorine so as to make the cell operative to supply electricity when the electrolyte is circulated through it. When refuellable cells or replaceable electrodes are used resaturation with chlorine will also have to be undertaken.

Depleted electrolyte 25 in line 23 is pumped by pumping means 27 into saturator vessel 29 having upper and lower portions 31 and 33. The electrolyte, a 25 percent zinc chloride solution in water, having less than one volume of chlorine therein, enters vessel 29 at inlet 35 near its top and flows downwardly through the vessel, dissolving finely divided chlorine bubbles 37 until it is saturated, and exits from the vessel through outlet 39 past pump 27 and back to battery 11. As is illustrated, the entry is at one side of the vessel 29 but various entry ports may be provided around the perimeter of the vessel or across the top thereof. In a similar manner, plural outlets may be provided but these are preferably located near the chlorine inlets so that a countercurrent flow effect is obtained and the greatest driving force of chlorine concentration is available at the outlet to make sure that the electrolyte is completely saturated with chlorine.

The chlorine circulation system comprises a source of chlorine, which may be pressurized tank 41, having an outlet valve 43 controlling chlorine flow through line 45 to spargers, diffusers or septa 47. The chlorine flow through the spargers, which are preferably of glass, porcelain, titanium, or plastic frit or of perforated materials of these types, is at a sufficient velocity to maintain the body of electrolyte 25 in vessel 29 in a state of turbulent motion which promotes solution of the chlorine gas in the electrolyte during the period in which they are in contact. The spargers may be so located and directed as to produce the best turbulent flows of electrolyte and chlorine streams or bubbles emitted from them. After most of the chlorine has dissolved in the electrolyte, if any of it is still undissolved, it rises to section 31 and forms a gaseous phase atop the electrolyte, which aids in dissolving chlorine in the upper portion of the electrolyte, normally of the lowest concentration because it is closest to the inlet for depleted electrolyte. From the top of the vessel the chlorine gas is recirculated through line 49 back to line 45, where it mixes with additional chlorine being charged, and subsequently it is sent back through the spargers to be dissolved in the electrolyte. Check valve means may be provided in line 49 and pumping or blowing means, not illustrated, may be utilized to assure that the chlorine in the upper portion of the saturator vessel is mixed in with fresh chlorine and is recirculated through the electrolyte.

A saturator vessel has been illustrated but it will be evident that the same principles may be applied to pipes, ducts, tubes or other passageways, reservoirs, tanks and other containers in which contact between finely divided chlorine gas streams and bubbles with electrolyte may be made. In such cases it will be important to entirely dissolve the gas in the electrolyte or provide some means for recovering the chlorine, possibly at a high point in a line or duct downstream from the main resaturation operation, so that the chlorine may be recirculated and not wasted.

The sparger of FIG. 2 is illustrated as circular and disc-like, having an inlet entrance section 51 to convey the chlorine to the various openings 53 in the surface 55 of the sparger and thereby convert a larger stream of chlorine gas into a multiplicity of very fine streams, which break into bubbles 37 in the volume of electrolyte. A top 59 is shown, containing holes 57 therein, through which the bubbles pass. The top helps to maintain the integrity of frit or very fine passages, but when the porous materials are sufficiently stable and well bonded, the top may be omitted. Of course, other shapes of spargers may be employed and they can be of various sizes, usually being from 1 cm. to 10 cm. in diameter. Constructions of such diffusers are known, and involve the partial fusion of many small pieces or frit of small materials, such as glass, porcelains and synthetic organic plastics, e.g., polytetrafluorethylene, polyvinyl chloride, after-chlorinated polyvinyl chloride, polymethyl methacrylate, polyethylene, polypropylene, chlorinated polyethylene and chlorinated polypropylene. Glass and Teflon are preferred sparger materials, the latter being especially useful because of its hydrophobic nature. The frit sizes, before fusion, will usually have one dimension in the 1 to 100 microns range and the frit will be fused together in such a way that the passages through it will be in the 1 to 100 micron range, preferably from 5 to 25 microns. Thus, when chlorine is passed through entrance 51 and into the channels of the sparger, it will be divided into very thin streams and will be emitted from the sparger in such streams into the electrolyte volume. Due to the circulation of electrolyte caused by the sparging forces and the electrolyte's flow, the stream will be broken up into bubbles, which provide greater surface areas to the electrolyte for absorption.

Instead of the spargers shown, septa and perforated discs of other designs can also be used, providing only that the outlets therefrom are sufficient in number so that the pressure drop is not exceptionally high, preferably not over 100 mm. of mercury at the rate of flow required for saturation of the electrolyte. It is also desirable that the passages or openings be of such construction that they do not become readily plugged or, if blocked, may be cleared by backwashing. No backwashing mechanism is shown but the methods of clearing blocked passageways in diffusers are well known and need not be illustrated here.

In operation, using the apparatus of FIG. 1 with the spargers of FIG.'S. 2 and 3, electrolyte from battery 11, depleted in chlorine content, is fed to vessel 29 and is withdrawn from that vessel at about the same rate at which it is added, maintaining a constant level of electrolyte at about 65 percent of the volume of the vessel. The battery which is a source of electrolyte to be saturated with chlorine may be of cells of the types described in Case 2802 Ser. No. 200,047 for MANUFACTURE OF CHLORINE HYDRATE, filed the same day as the present application, or U.S. Pat. application Ser. No. 50,054 for HALOGEN HYDRATES, in both of which applications the present inventor is a co-inventor. Normally, such level will be at from 10 to 80 percent of the vessel volume, preferably from 50 to 75 percent thereof. Chlorine, fed from a tank of compressed gas 41 of a source of chlorine such as chlorine hydrate, and mixed recirculating chlorine, which may come from several batteries, will be added to the vessel at the bottom thereof through spargers 55, which will be made of porcelain, glass frit, synthetic organic polymeric plastic, or other chlorine gas and zinc chloride solution resistant materials. At least one of such spargers will be located near the outlet of the saturated electrolyte being returned to the secondary battery or batteries. Sizes of the bubbles from the sparger will preferably be about 50 to 1,000 microns, e.g., 500 microns average, for best solubility in the electrolyte. In some cases, rather than have the recirculated chlorine mixed with the chlorine charged, it may be cycled back through particular sparger(s) and the rest of the chlorine to be added to the system may be directd through other sparger(s). However, generally it is preferred to blend the two sources of chlorine together before bubbling into the electrolyte. The mixing effect in the saturating vessel may be increased by having additional stirrers or circulators located therein but this is not usually necessary. The velocity of the gas being passed through the spargers will be sufficient to produce a mixing effect in the vessel to keep all of the electrolyte solution in motion, avoiding any dead spots in the vessel and thereby promoting solubility of the chlorine gas. Normally too, the electrolyte removed from the vessel will be completely saturated with chlorine. The velocity of the gas from the spargers will generally be from 1 to 1,000 centimeters per second, preferably from 10 to 500 cm. per second. Also, best operating conditions for solubility are in the temperature range of −20° to 70°C. and in the pressure range of 0.5 to 10 atmospheres, greater pressures not being desirable for operation of the battery. Preferred temperatures are in the range of −10° to 20°C. and such pressures are at about 1 atmosphere ±10 percent. In most operations it is found that the portion of chlorine recycled will usually be in the range of 5 to 25 percent of that sparged into the electrolyte and preferably, this will be from 5 to 15 percent. It is still desirable, however, to maintain the preferred volume of electrolyte in the vessel at 50 to 75 percent to provide sufficient volume for absorption and to prevent a carryover of the liquid into the chlorine recycle duct.

In addition to efficiently resaturating the zinc chloride solution with chlorine, which solution is normally at a zinc chloride concentration of 10 to 35 percent depending on the temperature thereof, the present apparatus and method allow for efficient operation in conjunction with high energy density batteries of the zinc-zinc chloride-chlorine type, whether joined together and all operating, or whether only a few batteries or a single battery is returning depleted electrolyte to the vessel or being resaturated in a duct or passageway. Automatic controls may be employed to maintain the proportion of chlorine flow compared to electrolyte flow or such controls may be manual, as by adjustment of valve 43. The apparatus and method are not sensitive to changes in demands and can withstand prolonged down periods without harm to the unit or parts of it. In fact, upon startup, due to the location of the chlorine spargers near the exit point for resaturated electrolyte to be returned to the batteries, the initial electrolyte sent through the batteries will have dissolved chlorine in it and its concentration of chlorine will quickly increase.

The following examples illustrate but do not limit the operation of the invention. All parts are by weight and all temperatures are in °C., unless otherwise indicated.

EXAMPLE 1

Using an apparatus of the type illustrated in the drawing, with 16 spargers evenly distributed over a bottom of the cylindrical vessel and forcing chlorine gas at a pressure of 20 millimeters of mercury through the spargers into the vessel ⅔ filled with depleted electrolyte circulating from a discharging high energy density battery of bank of such batteries, containing about 25 percent of zinc chloride in water, the solution is raised to its operating concentration of dissolved chlorine. Thus, whereas the material charged to the saturating vessel contains as little as 30 volume percent of chlorine, that discharged contains about 70 volume percent or more of chlorine, on the basis of the volume of the electrolyte. At higher absolute pressures in the vessel, the head or driving force on the chlorine will be about the same but the content of dissolved chlorine in the product will be greater. In addition to the depleted electrolyte, which may have some chlorine gas with it, and in addition to the chlorine directly charged to the spargers from a source of pressurized chlorine or chlorine hydrate, some of the chlorine utilized is recycled from the volume on top of the electrolyte solution. In the present example, the proportion of recycle is about 10 percent.

The flow of electrolyte into the saturating vessel is at the rate of about 15 liters per minute per 50 volt battery and when the resaturator is employed for six batteries, the flow will be 90 liters per minute. The volume of liquid in the vessel is such that there is a complete change within 10 seconds to a minute and, in the present example, in about 30 seconds or less. Due to the finely divided bubbles of chlorine and the good contact with the electrolyte obtained, the electrolyte produced is sufficiently saturated with chlorine. For best operation, the velocity of the gas through the spargers is about 200 centimeters per second and the temperature of the gas and electrolyte is about 0°C. Because the operating temperature of the batteries is usually about 30°C. (although this may be varied somewhat), it is generally desirable to utilize refrigerating means, not shown in the drawing, to lower the electrolyte and gas temperatures for speediest saturation. However, satisfactory resaturation is obtainable at 30°C. with the present apparatus, following the methods described herein.

The spargers employed are constructed of glass frit, fused together and protected by a perforated cover plate. At least one sparger is located near the outlet from the saturator, to improve countercurrent contact with the electrolyte and better dissolve the chlorine. The sparger frit is of such size that at least one dimension thereof is in the 1 to 100 microns range and the passages made between the pieces of fused glass average about 10 to 20 microns. The spargers employed are 5 cm. in diameter and each carries a proportionate volume of the chlorine being added to the electrolyte. The bubbles produced by directing the thin streams of chlorine gas through the sparger openings grow to diameters ranging from 50 to 1,000 microns according to the combined effects of contact angle, gas velocity and severity of agitation of the electrolyte.

After having been "resaturated" with chlorine, the electrolyte is returned to the high energy density battery, in this case a zinc-zinc chloride-chlorine battery, wherein it causes the generation of an open cell voltage of 2.1 volts per cell, or 1.7 volts at 8 amperes per cell. The cells are each of about 250 square centimeters effective working area on each of the active bipolar electrodes.

In modifications of this method, instead of aqueous zinc chloride electrolyte, other metal chloride electrolytes are employed, e.g., chlorides of iron and nickel, and mixed metal halide solutions, and the same desirable results are obtained. When the pressure of the system is raised to five atmospheres, a more highly saturated solution is produced and saturation is achieved in less than half the time otherwise taken.

EXAMPLE 2

The method of Example 1 is followed with the exceptions that: the protective cover plate on the sparger surface is removed; essentially no chlorine gas is charged to the saturating vessel with the electrolyte; the makeup chlorine is derived entirely from chlorine hydrate; the proportion of recycled chlorine in the vessel is 20 percent; and additional mechanical agitation means (not shown in the drawing) are employed to promote intimate contact of the chlorine bubbles with the electrolyte. Also, the spargers are tilted so as to have half of them directed against the walls of the vessel to avoid any dead spots therein and the driving force for the gas is increased so that the linear velocity thereof exiting from the spargers is about 500 cm./second. Under such conditions, utilizing the same vessel and the same spargers previously employed, saturation is reached in about half the time.

In preferred embodiments of the invention, such as those illustrated in this example, automatic controls will be utilized to regulate the temperatures, pressures, feed rates and agitation, so that the resaturated electrolyte or other aqueous solution will have the correct amount of chlorine dissolved therein and will enter the high energy density battery at the desired temperature.

The invention has been described with respect to illustrations and examples thereof but it is clear that it is not to be limited to these because equivalents may be substituted for elements or steps in the invention without departing from the spirit of the invention or going beyond its scope.

What is claimed is:

1. A method for preparing a chlorine saturated aqueous zinc chloride electrolyte for use as an electrolyte in an electrical energy storage device having a source of chlorine and an electrode compartment with at least one positive and one negative electrode therein, said electrode compartment having an inlet means and an outlet means, comprising the steps:
    1. passing chlorine from the source of chlorine to an inlet duct located in the bottom of a vessel having an aqueous zinc chloride solution therein; said vessel having an outlet means located near the bottom of the vessel, which outlet means is in communication with the electrode compartment inlet means, and an electrolyte solution inlet means in communication with the electrode compartment outlet means, said solution inlet means being spaced apart from the outlet means;
    2. bubbling the chlorine through the inlet duct to the zinc chloride solution at a velocity of from 1 to 1,000 centimeters per second, so that bubbles will form, ranging in size from about 50 to 1,000 microns, resulting in a zinc chloride solution saturated with chlorine;
    3. removing undissolved chlorine from the vessel;
    4. mixing the chlorine from Step No. 3 with additional chlorine from the chlorine source and passing it to the inlet duct;
    5. passing the chlorine saturated zinc chloride solution from the outlet means of the vessel to the electrode compartment inlet means;
    6. passing the zinc chloride from the electrode compartment outlet means to the solution inlet means in the vessel; and
    7. maintaining the zinc chloride in the vessel at a level below that of the solution inlet means.

2. A method according to claim 1 wherein the temperature of the zinc chloride solution charged to the volume of moving zinc chloride solution is from $-20°$ to $70°C.$, the pressure is from 0.5 to 10 atmospheres, the saturated zinc chloride solution is employed as a feed to a high energy density secondary battery and the unsaturated zinc chloride to be saturated is from the battery.

3. The method according to claim 1 wherein the aqueous solution of zinc chloride to be saturated with chlorine is from the effluent of a battery or plurality of batteries, and the chlorine gas is from chlorine hydrate which decomposes to chlorine and water.

* * * * *